United States Patent
Cho et al.

(10) Patent No.: US 8,369,065 B2
(45) Date of Patent: Feb. 5, 2013

(54) ELECTRIC DOUBLE LAYER CAPACITOR

(75) Inventors: Yeong Su Cho, Gyunggi-do (KR); Kang Heon Hur, Gyunggi-do (KR); Kwan Hyeong Kim, Gyunggi-do (KR); Chang Ryul Jung, Seoul (KR); Sang Kyun Lee, Gyunggi-do (KR); Sung Ho Lee, Gyunggi-do (KR); Dong Sup Park, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 556 days.

(21) Appl. No.: 12/654,753

(22) Filed: Dec. 30, 2009

(65) Prior Publication Data

US 2011/0069426 A1     Mar. 24, 2011

(30) Foreign Application Priority Data

Sep. 18, 2009   (KR) .................. 10-2009-0088739

(51) Int. Cl.
*H01G 9/00* (2006.01)
(52) U.S. Cl. ........ 361/502; 361/540; 361/512; 361/504; 361/505; 361/528
(58) Field of Classification Search .................. 361/502, 361/540, 512, 525, 504, 505, 527, 528, 321.2, 361/524
See application file for complete search history.

(56) References Cited

U.S. PATENT DOCUMENTS

| | | | | |
|---|---|---|---|---|
| 5,136,472 A | * | 8/1992 | Tsuchiya et al. | 361/502 |
| 5,859,761 A | * | 1/1999 | Aoki et al. | 361/502 |
| 5,907,472 A | * | 5/1999 | Farahmandi et al. | 361/502 |
| 6,094,338 A | * | 7/2000 | Hirahara et al. | 361/502 |
| 6,507,479 B2 | | 1/2003 | Saito et al. | |

FOREIGN PATENT DOCUMENTS

| | | |
|---|---|---|
| JP | 59-48917 | 3/1984 |
| JP | 11-274004 | 10/1999 |
| JP | 10-2004-0031958 | 4/2004 |
| JP | 2007-220696 | 8/2007 |

OTHER PUBLICATIONS

Japanese Office Action dated Jan. 10, 2012 issued in corresponding Japanese Patent Application No. 2010-006544.
Korean Office Action issued Feb. 9, 2011 in corresponding Korean Patent Application 10-2009-0088739.
Japanese Notice of Information Provision dated Aug. 30, 2011 in corresponding Japanese Patent Application 2010-006544.

\* cited by examiner

*Primary Examiner* — Nguyen T Ha
*Assistant Examiner* — Hung Dang (57) ABSTRACT

An electric double layer capacitor (EDLC) includes an electric double layer cell and first and second external electrodes. The electric double layer cell includes a separator and at least one first polarizable electrode and at least one second polarizable electrode. The first and second external electrodes are formed at first and second side surfaces of the electric double layer cell facing each other, respectively. The first polarizable electrode includes a first current collection layer and a first active material layer formed on either surface of the first current collection layer facing the separator and the second polarizable electrode includes a second current collection layer and a second active material layer formed on either surface of the second current collection layer facing the separator.

6 Claims, 8 Drawing Sheets

ELECTRIC DOUBLE LAYER CAPACITOR

CROSS-REFERENCE TO RELATED APPLICATIONS

This application claims the priority of Korean Patent Application No. 10-2009-0088739 filed on Sep. 18, 2009, in the Korean Intellectual Property Office, the disclosure of which is incorporated herein by reference.

BACKGROUND OF THE INVENTION

1. Field of the Invention

The present invention relates to an electric double layer capacitor (EDLC), and more particularly, to an EDLC which has high energy density and ultra low equivalent series resistance (ESR) characteristics, while having a chip structure in which the thickness is easily controlled, and a method of manufacturing the same.

2. Description of the Related Art

In various electronic products such as information communication devices, a stable energy supply is considered to be an important element. In general, such a function is performed by a capacitor. That is, the capacitor serves to store electricity in a circuit provided in various electronic products such as information communication devices and then discharge the electricity, thereby stabilizing the flow of electricity in the circuit.

A general capacitor has a short charge and discharge time, a long lifespan, and high output density. However, since the general capacitor has low energy density, there is a limitation in using the capacitor as a storage device. To overcome such a limitation, a new category of capacitors such as an EDLC have been recently developed, which have a short charge and discharge time and high output density. Much attention is being paid to such capacitors as a next generation energy device together with secondary cells.

The EDLC is an energy storage device using a pair of charge layers (electrode layers) having a different polarity. The EDLC may perform continuous electric charge and discharge and has higher energy efficiency and output and greater durability and stability than general other more general capacitors.

A basic structure of the EDLC includes a polarizable electrode, an electrolyte, and a separator. The polarizable electrode has an active material layer and a current collection body, the active material layer having a relatively large surface area like a porous electrode. The operational principle of the EDLC is an electro-chemical mechanism in which electricity is generated when a voltage of several volts is applied to both ends of a unit cell electrode such that ions in the electrolyte move along an electric field to be adsorbed by electrode surface.

EDLCs which are currently commonly used may be roughly classified into two types, that is, a wound structure and a coin-shaped structure.

The wound-structure EDLC is manufactured by winding a current collection body and an insulating paper serving as a separator together in a circular shape, the current collection body being coated with an active material layer such as activated carbon. The coin-shaped EDLC is manufactured by punching an activated carbon electrode and an insulating paper to insert into a coin-shaped metal case.

Such structures according to the related art should implement high energy density and low ESR. That is, a large area is required in order to obtain high energy density. However, a process of implementing the large area is complicated, and separate external terminals are connected to collect currents into unit cells. Therefore, resistance inevitably increases, making it difficult to implement low ESR characteristics.

SUMMARY OF THE INVENTION

An aspect of the present invention provides an electric double layer capacitor (EDLC) which implements high energy density and low equivalent series resistance (ESR) characteristics through an increase in area of electrodes.

Another aspect of the present invention provides a method of manufacturing an EDLC which satisfies high energy density and low ESR characteristics and may be implemented by a simplified process.

According to an aspect of the present invention, there is provided an EDLC including an electric double layer cell including: a separator and at least one first polarizable electrode and at least one second polarizable electrode which are alternatively stacked with the separator interposed therebetween; and first and second external electrodes formed at first and second side surfaces of the electric double layer cell facing each other, respectively.

The first polarizable electrode includes a first current collection layer and a first active material layer formed on either surface of the first current collection layer facing the separator, extends to the first side surface of the electric double layer cell so as to be connected to the first external electrode, and is electrically separated from the second side surface so as to be insulated from the second external electrode, and the second polarizable electrode includes a second current collection layer and a second active material layer formed on either surface of the second current collection layer facing the separator, extends to the second side surface of the electric double layer so as to be connected to the second external electrode, and is electrically separated from the second side surface so as to be insulated from the first external electrode.

The EDLC may further include a first insulating portion formed between the first polarizable electrode and the first side surface of the electric double layer cell such that the first polarizable electrode and the second external electrode are electrically insulated from each other, and a second insulating portion formed between the second polarizable electrode and the second side surface of the electric double layer cell such that the second polarizable electrode and the first external electrode are electrically insulated from each other.

The plurality of first polarizable electrodes and the plurality of second polarizable electrodes may be provided, each of the first polarizable electrodes positioned inside the electric double layer cell may include two first active material layers positioned on both surfaces of the first current collection layer, and each of the second polarizable electrodes positioned inside the electric double layer cell may include two second active material layers positioned on both surfaces of the second current collection layer.

The first polarizable electrode positioned at one outer surface of the electric double layer cell may include one first active material layer, and the second polarizable electrode positioned at the other outer surface of the electrode double layer cell may include one second active material layer.

The first and second electrodes and the separators may be exposed to the other side surfaces excluding the first and second side surfaces among the side surfaces of the electric double layer cell. The electric double layer cell may have a rectangular parallelepiped structure.

According to another aspect of the present invention, there is provided a method of manufacturing an EDLC including: forming a plurality of active material layers for a plurality of capacitors on at least one surface of n electrode sheets (where n is a positive integer) to provide a plurality of polarizable electrodes on the respective electrode sheets; removing portions of each of the electrode sheets adjacent to one sides of the respective active material layers to form a plurality of open regions corresponding to the respective polarizable electrodes; stacking the plurality of electrode sheets and a plurality of separators such that the active material layers of the adjacent electrode sheets are arranged to face each other with the separator interposed therebetween, thereby forming a multilayer body including a plurality of electric double layer cells; cutting the multilayer body into a plurality of electric double layer cells; and forming first and second external electrodes on first and second side surfaces of each of the cut electric double layer cells, respectively, the first and second side surfaces corresponding to the first and second corners, respectively. The electrodes sheets are classified into (2n)-th electrode sheets and (2n−1)-th electrode sheets depending on the stacking order, the open regions formed in the (2n)-th electrode sheets are positioned to be connected to a first corner of the electric double layer cell, and the open regions formed in the (2n−1)-th electrode sheets are positioned to be connected to a second corner of the electrode double layer cell.

The polarizable electrodes obtained from the (2n−1)-th electrode sheets are connected to the first external electrode, and the polarizable electrodes obtained from the (2n)-th electrode sheets are connected to the second external electrode.

The method may further include filling the plurality of open regions with an insulating material to form a plurality of insulating portions, between the forming of the open regions and the forming of the multilayer body. The respective insulating portions formed on the 2n(th) electrode sheets electrically insulate the first external electrode of the electric double layer cell from the polarizable electrodes obtained from the (2n)-th electrode sheets, and the respective insulating portions formed on the (2n−1)-th electrode sheets electrically insulate the second external electrode of the electric double layer cell from the polarizable electrodes obtained from the (2n−1)-th electrode sheets.

The number of the polarizable electrodes may be equal to or more than three, and the active material layer of the electrode sheet positioned inside the multilayer body may be formed on both surfaces of the electrode sheet. In this case, the active material layer of the electrode sheet positioned at an outer surface of the multilayer body may be formed only on one surface of the electrode sheet.

In the cutting of the multilayer body, the cutting may be performed in such a manner the polarizable electrodes and the separators are exposed to the other side surfaces excluding the first and second side surfaces among the side surfaces of the electric double layer cell.

The cut electric double layer cells may have a rectangular parallelepiped structure.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the thicknesses of layers and regions are exaggerated for clarity. Like reference numerals in the drawings denote like elements, and thus their description will be omitted.

Figure 1:
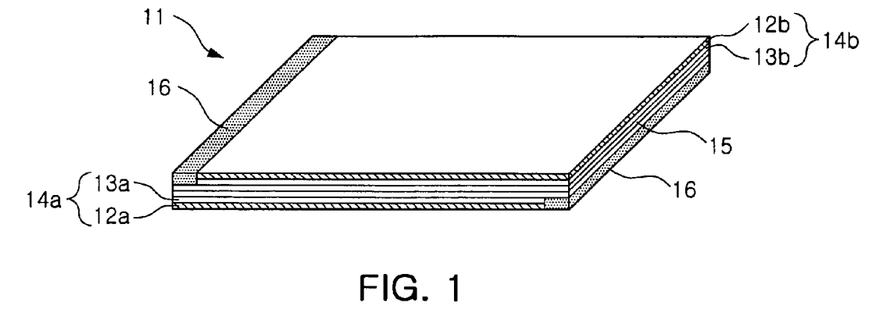
FIG. 1 is a perspective view of an example of an electric double layer cell which may be adopted in an electric double layer capacitor (EDLC) according to an embodiment of the present invention.

FIG. 1 is a perspective view of an example of an electric double layer cell which may be adopted in an electric double layer capacitor (EDLC) according to an embodiment of the present invention.

Referring to FIG. 1, the electric double layer cell 11 includes a separator 15 and first and second polarizable electrodes 14a and 14b which are stacked with the separator 15 interposed therebetween. The separator 15 may be formed of a short fiber such as cellulose, a composite fiber, or an insulating material such as a pulp through which ions may permeate.

The first polarizable electrode 14a includes a first current collection layer 12a and a first active material layer 13a formed on either surface of the first current collection layer 12a facing the separator 15. Similarly, the second polarizable electrode 14b includes a second current collection layer 12b and a second active material layer 13b formed on either surface of the second current collection layer 12b facing the separator 15.

In such an arrangement, the separator 15 is positioned between the active material layers 13a and 13b of the polarizable electrodes 14a and 14b having different polarities to separate the active material layers 13a and 13b facing each other.

The first and second current collection layers 12a and 12b may be formed of a metal such as aluminum with high electrical conductivity. The first and second active material layers 13a and 13b may be formed of an active material such as activated carbon with a high specific surface area.

Referring to FIG. 1, the first polarizable electrode 14a extends to a first side surface of the electric double cell 11, but is electrically separated from a second side surface positioned in the opposite side. Similarly, the second polarizable electrode 14b extends to the second side surface of the electric double cell 11, but is electrically separated from the first side surface.

An insulating portion 16 is formed between each of the first and second polarizable electrodes 14a and 14b and the side surface to which the corresponding polarizable electrode is not connected.

In this embodiment, the first and second side surfaces of the electric double layer cell 11 may be understood as surfaces on which external electrodes for a complete EDLC are to be formed. Therefore, such a separation structure formed by the insulating portion may prevent the first and second polarizable electrodes 14a and 14b from being connected through the external electrodes to be formed.

Different from this embodiment, each of the polarizable electrodes may be formed to be spatially spaced from the corresponding side surface to guarantee electrical insulation, even though the insulating portion 16 is not used. As in this embodiment, however, the separation of the first and second polarizable electrodes 14a and 14b from the side surfaces may be effectively implemented by the insulating portion 16. When the electrical insulation is implemented using the insulating unit 15 as in this embodiment, the thickness of an entire chip may be uniformized, and a short circuit may be prevented more effectively.

The first and second polarizable electrodes 14a and 14b and the separator 15 may be exposed to the other side surfaces excluding the first and second side surfaces among the side surfaces of the electrode double layer cell 11. Through the other surfaces, the first and second active material layers 13a and 13b and the separator 15 may be properly digested in an electrolyte.

Referring to FIG. 1, the electric double layer cell 11 may have a rectangular parallelepiped structure similar to a typical chip structure. Furthermore, the electrode double layer cell 11 may have a similar structure to that of a multilayer chip capacitor (MLCC) in which external electrodes are formed on both of the side surfaces to which the first and second polarizable electrodes selectively extend.

Figure 2:
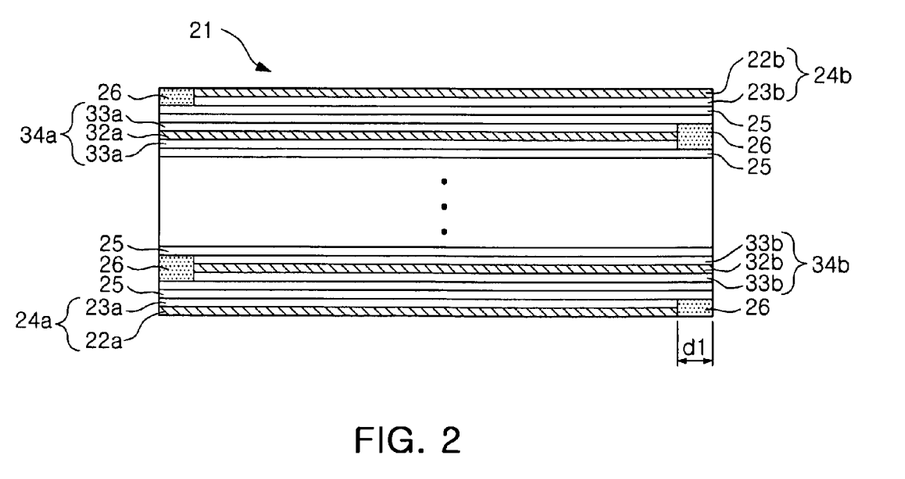
FIG. 2 is a side view of an electric double layer cell which may be adopted in the EDLC according to the embodiment of the present invention.
Figure 3:
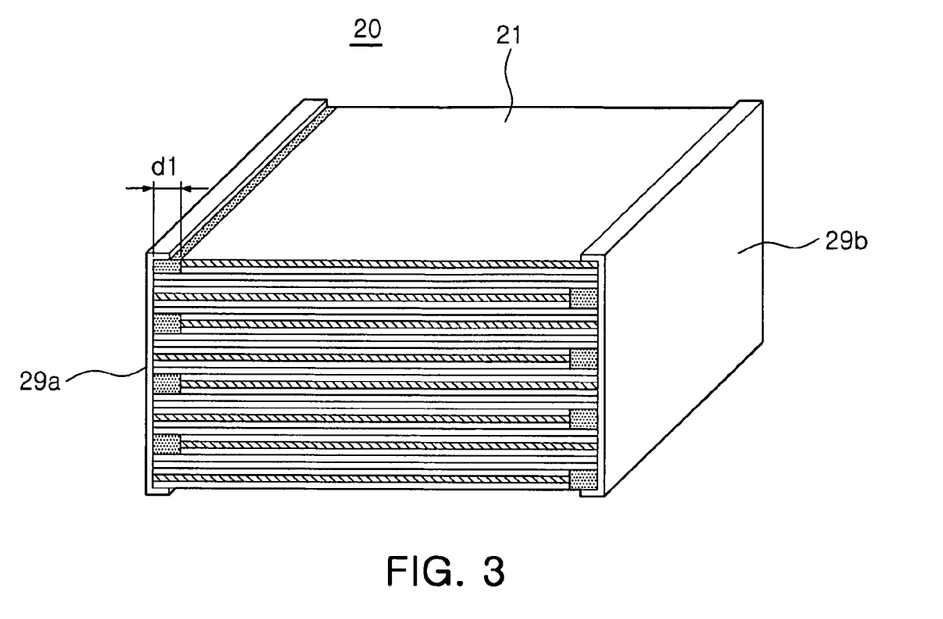
FIG. 3 is a perspective view of the EDLC adopting the electric double layer cell of FIG. 2.

The electric double layer cell 11 illustrated in FIG. 1 may be understood as a minimum unit cell for forming the EDLC according to the embodiment of the present invention. To obtain high energy density, a multilayer cell structure may be formed in which capacitor elements implemented by a plurality of cells are connected in parallel. FIGS. 2 and 3 illustrate such a structure.

FIG. 2 is a side view of the EDLC according to the embodiment of the present invention. FIG. 3 is a perspective view of the EDLC illustrated in FIG. 2.

FIG. 2 illustrates an electric double layer cell which may be adopted in the EDLC according to the embodiment of the present invention. FIG. 3 illustrates the EDLC adopting the electric double layer cells of FIG. 2.

The electric double layer cell 21 of FIG. 2 includes a plurality of separators 25 and a plurality of first and second polarizable electrodes 24a, 34a, 24b, and 34b. The first and second polarizable electrodes adjacent to each other are stacked with a separator 25 interposed therebetween.

In this embodiment, the plurality of first polarizable electrodes 24a and 34a and the plurality of second polarizable electrodes 24b and 34b are alternately stacked. In such a multilayer structure, each of the polarizable electrodes may have a different number of adjacent polarizable electrodes depending on the position of the polarizable electrode. That is, referring to FIG. 2, each of the first and second polarizable electrodes 24a and 24b positioned at outer surfaces is adjacent to one polarizable electrode having a different polarity. Therefore, the polarizable electrode has an active material layer 23a or 23b formed on only one surface. On the other hand, each of the first and second polarizable electrodes 34a and 34b positioned inside has both surfaces adjacent to polarizable electrodes having a different polarity. Therefore, an active material layer 33a or 33b needs to be formed on both surfaces.

Specifically, the first and second polarizable electrodes 24a and 24b positioned at the outer surfaces include first and second current collection layers 22a and 22b and first and second active material layers 23a and 23b, respectively, similar to the structure illustrated in FIG. 1. The first active material layer 23a is formed on either surface of the first current collection layer 22a facing the separator 25, and the second active material layer 23b is formed on either surface of the second current collection layer 22b facing the separator 25.

In the first and second polarizable electrodes 34a and 34b positioned inside, both surfaces of the first and second current collection layers 32a and 32b, respectively, face the separator 25. Therefore, the first active material layer 33a is formed on both surfaces of the first current collection layer 32a, and the second active material layer 33b is formed on both surfaces of the second current collection layer 32b.

In such a multilayer structure, all the active material layers 23a, 23b, 33a, and 33b provided on the respective current collection layers 22a, 22b, 32a, and 32b are separated by the separators 25 so as to function as individual capacitor cells.

If necessary, the structure of the polarizable electrode positioned at the outer surface may be changed into the same structure as that of the polarizable electrode positioned inside, that is, the current collection structure in which the active material layer is formed on both surfaces.

In this case, the active material layer positioned at the outermost surface does not function as a capacitor. However, since the operation is performed using sheets having the same structure, the process may be performed more efficiently.

In this embodiment, the first polarizable electrodes 24a and 34a extend to a first side surface of the electric double layer cell 21, but are electrically separated from a second side surface positioned in the opposite side by insulating portions 26, respectively. Similarly, the second polarizable electrodes 24b and 34b extend to the second side surface of the electric double layer cell 21, but are electrically separated from the first side surface by the insulating portions 26, respectively.

The electric double layer cell 21 of FIG. 2 has two facing side surfaces to which the first and second polarizable electrodes 24a, 34a, 24b, and 34b are selectively exposed by the insulating portions 26.

Referring to FIG. 3, first and second external electrodes 29a and 29b may be formed on the two side surfaces, respectively, to implement the EDLC 20. This structure may be understood as a typical chip structure similar to an MLCC, and may be provided as a rectangular parallelepiped structure as illustrated in FIG. 3. The first and second external electrodes 29a and 29b may be formed by a known process such as electroless plating or printing.

In this embodiment, when the first and second external electrodes 29a and 29b have portions which partially extend over upper and lower surfaces, respectively, the portions may be formed to have a width which does not exceed the width d1 of the insulating portion, in order to prevent an undesirable short circuit.

Such an electric double layer cell may be manufactured using prepared sheets with a predetermined thickness. Therefore, it is possible to uniformly control the thickness of finalized products and to reduce equivalent series resistance (ESR). Furthermore, since the EDLC illustrated in the above-described embodiment may be manufactured using sheets, it is possible to realize mass production easily.

A method of manufacturing an EDLC according to another embodiment of the present invention will be described with reference to FIGS. 4 to 8.

Figure 4A:
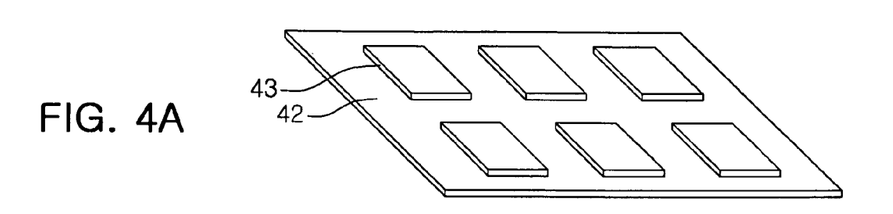
FIGS. 4A to 4C illustrate a process of the method of manufacturing an EDLC according to the embodiment of the present invention.
Figure 4B:
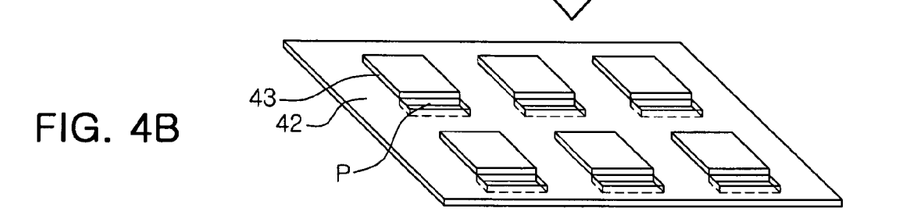
Figure 4C:
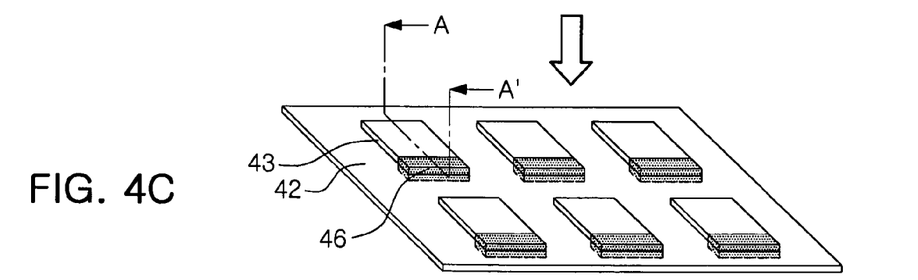
Figure 5:
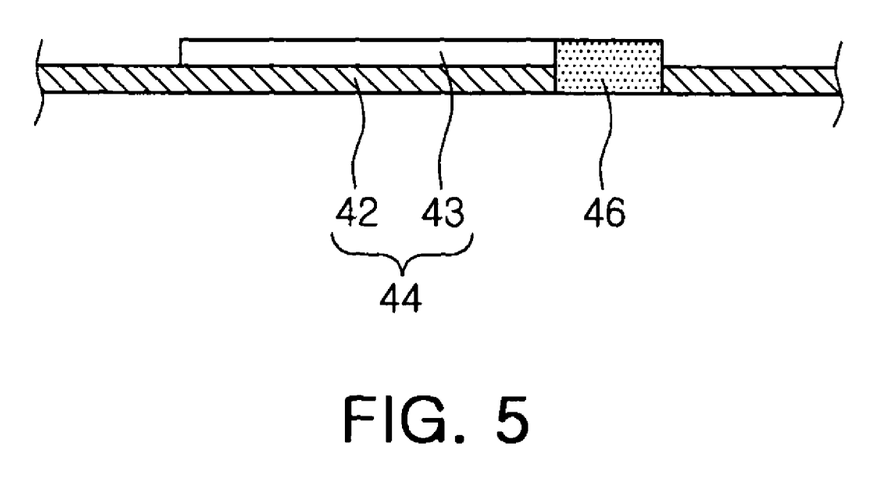
FIG. 5 is a side cross-sectional view of the electrode sheet illustrated in FIG. 4C.
Figure 6A:
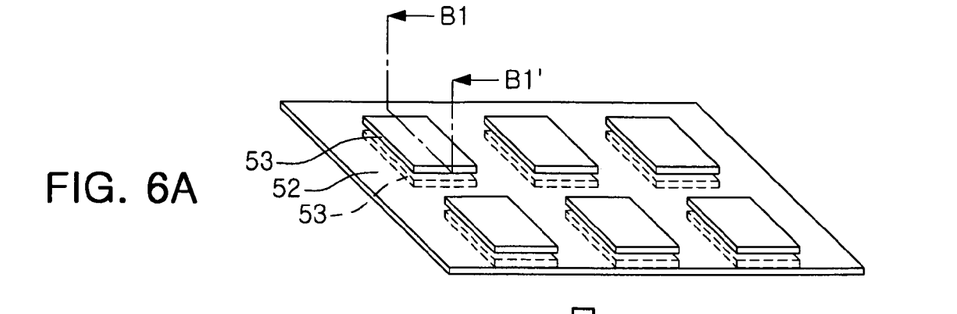
FIGS. 6A to 6C are diagrams illustrating another process of the method of manufacturing an EDLC according to the embodiment of the present invention.
Figure 6B:
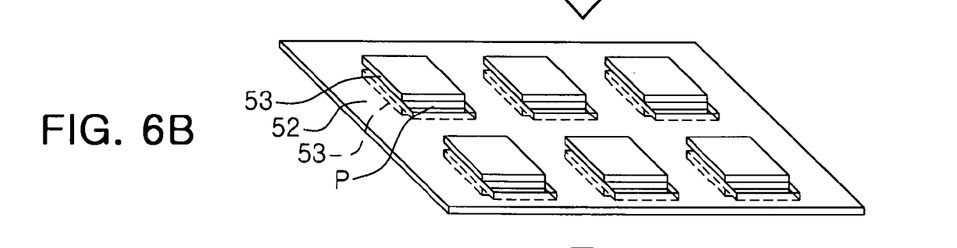
Figure 6C:
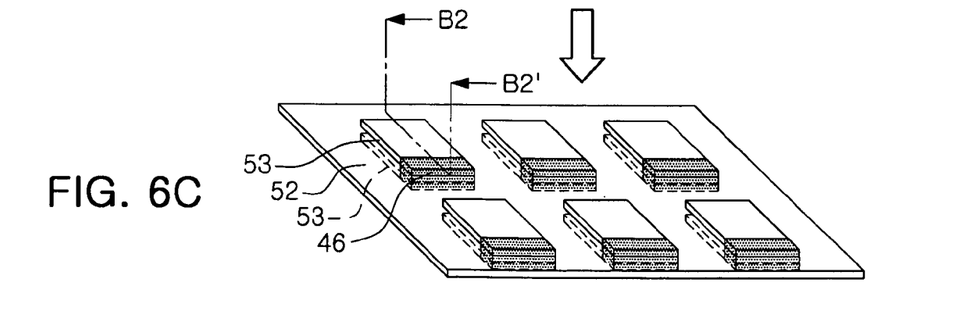

First, referring to FIGS. 4 to 6, a process of preparing a polarizable sheet is performed.

FIGS. 4A to 4C illustrate a process of the method of manufacturing an EDLC according to the embodiment of the present invention. In this process, an electrode sheet for polarizable electrodes is prepared, which is to be positioned at an outer surface of a multilayer body.

Referring to FIG. 4A, a plurality of active material layers 43 for a plurality of capacitors are formed at constant intervals on an electrode sheet 42 for current collection layers to provide a plurality of polarizable electrodes on the electrode sheet 42.

The electrode sheet 42 may be formed of an aluminum foil, and the active material layer 43 may be formed of activated carbon. The active material layer 43 may be formed as follows: activated carbon is mixed with a solvent to be printed in a paste state. However, the active material layer 43 may be formed by attaching a material manufactured in a sheet type.

Subsequently, referring to FIG. 4B, portions of the electrode sheet 42 adjacent to one sides of the respective active material layers 43 are removed to form a plurality of open regions P corresponding to the respective polarizable electrodes.

As the open regions P are formed, it is possible to implement the structure of the electric double layer cell, in which each of the polarizable electrodes is connected to one side surface but not connected to the opposite side surface, as described with reference to FIGS. 1 and 2. The process of forming the open regions P may be performed by a punching process.

Only with the open regions P, each of the polarizable electrodes may be physically separated from the opposite side surface to implement insulation. However, to reduce a thickness variation on the entire surface of a chip with more stable electrical insulation, the plurality of open regions P may be filled with an insulating material to form insulating portions 46, as illustrated in FIG. 4C.

FIG. 4C illustrates a case in which only the open regions P are filled with an insulating material. If necessary, however, the open regions P are filled by a screen printing process, and simultaneously, an insulating material may be applied onto the other region of the electrode sheet 42 excluding the formation regions of the active material layers 43. FIG. 5 is a partial side cross-sectional view of the electrode sheet including a polarizable electrode 44 with an insulating portion 46, taken along a line A-A' of FIG. 4C. Referring to FIG. 5, the insulating portion 46 may be formed to a similar thickness to that of the polarizable electrode 44, that is, the total thickness of the active material layer 43 and the electrode sheet 42.

FIGS. 6A to 6C are diagrams illustrating another process of the method of manufacturing an EDLC according to the embodiment of the present invention, showing an electrode sheet for polarizable electrodes which are to be positioned inside a multilayer body. That is, this process is an example in which active material layers are formed on both surfaces of the electrode sheet.

Figure 7A:
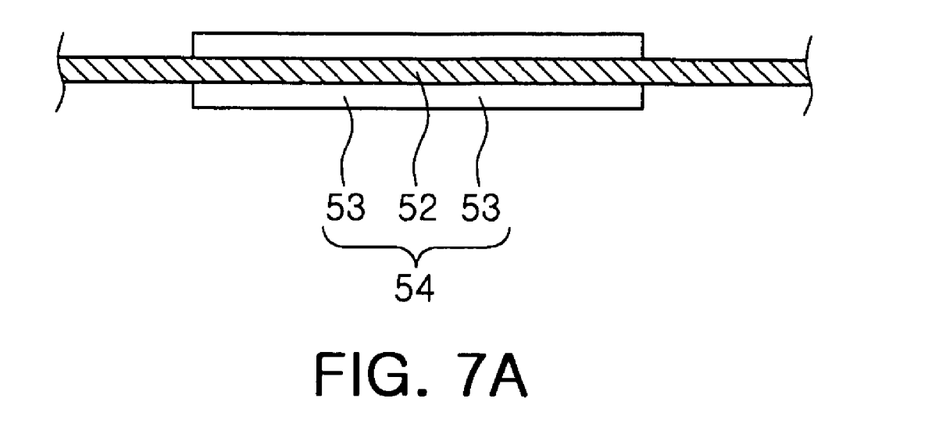
FIGS. 7A and 7B are side cross-sectional views of the electrode sheet illustrated in FIGS. 6A and 6B, respectively.

Referring to FIG. 6A, a plurality of active material layers 53 for a plurality of capacitors are formed at constant intervals on both surfaces of the electrode sheet 52 for current collection layers to provide a plurality of polarizable electrodes on the electrode sheet 52. FIG. 7A is a partial side cross-sectional view of the electrode sheet 52, taken along a line B1-B1' of FIG. 6A. Referring to FIG. 7A, the active material layers 53 formed on both surfaces of the electrode sheet 52 are positioned at regions corresponding to each other, respectively, with the electrode sheet 52 interposed therebetween.

Next, referring to FIG. 6B, portions of the electrode sheet 52 adjacent to one sides of the respective active material layers 53 are removed to form a plurality of open regions P corresponding to the respective polarizable electrodes. Such a process may be performed by a known punching process.

Subsequently, referring to FIG. 6C, the plurality of open regions P are filled with an insulating material. FIG. 6C illustrates a case in which the open regions are filled with an insulating material. If necessary, however, the open regions P are filled by a screen printing process, and simultaneously, an insulating material may be applied onto the other region of the electrode sheet 52 excluding the formation regions of the active material layers 53.

Figure 7B:
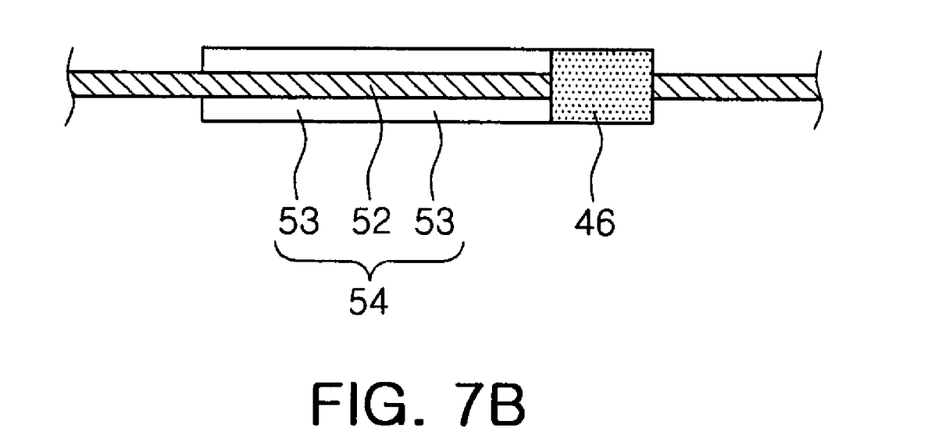

FIG. 7B is a partial side cross-sectional view of the electrode sheet including a polarizable electrode 54 with the insulating portion 46, taken along a line B2-B2' of FIG. 6C. Referring to FIG. 7B, the insulating portion 46 may be formed to a similar thickness to that of the polarizable electrode 54, that is, the total thickness of the active material layer 53 and the electrode sheet 52.

Figure 8A:
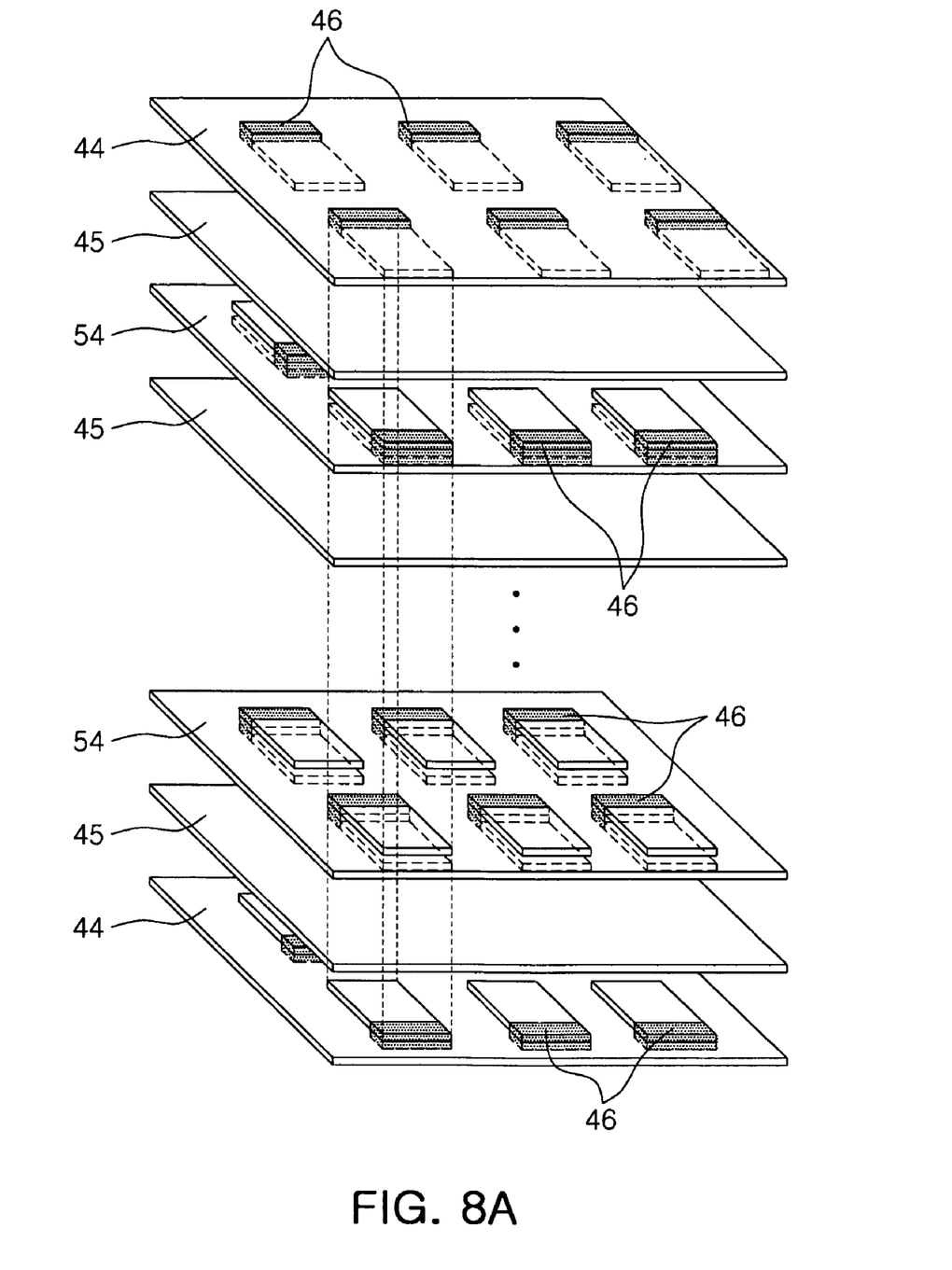
FIG. 8A is a diagram illustrating a process of forming a multilayer body in the method of manufacturing an EDLC according to the embodiment of the present invention.
Figure 8B:
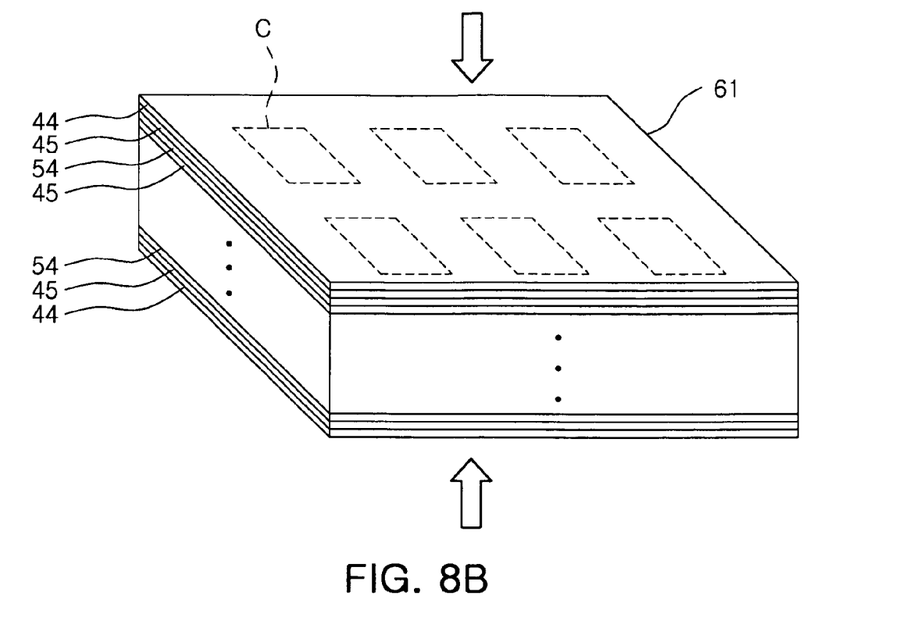
FIG. 8B is a diagram illustrating a process of pressurizing and cutting the multilayer in the method of manufacturing an EDLC according to the embodiment of the present invention.

Subsequently, the plurality of electrode sheets 42 and 52 prepared by the processes illustrated in FIGS. 4 and 6 and separators 45 are stacked as illustrated in FIG. 8A, and then pressurized to form a multilayer body 61 for the electric double layer cell, as illustrated in FIG. 8B. Two electrode sheets 42 positioned at both outer surfaces thereof are electrode sheets illustrated in FIG. 4C, and the plurality of electrode sheets 52 positioned inside are electrode sheets illustrated in FIG. 6C.

In this stacking process, the active material layers 43 and 53 of the adjacent electrode sheets 42 and 52 are arranged to face each other with the separator 45 interposed therebetween. Furthermore, the arrangement direction of the electrode sheets 42 and 52 is determined in such a manner that the one sides thereof are alternately connected to the other sides thereof in order to discriminate between the polarities of the respective polarizable electrodes 44 and 54.

More specifically, the electrode sheets 42 and 52 used in this process may be classified into (2n)-th electrode sheets and (2n−1)-th electrode sheets depending on the stacking order. In this case, the insulating portions 46 formed in the (2n)-th electrode sheets are positioned so as to be connected to a first corner of the electric double layer cell, and the insulating portions 46 formed in the (2n−1)-th electrode sheets are positioned so as to be connected to a second corner of the electric double layer cell.

The first and second corners may correspond to the first and second side surfaces of a cut cell. The arrangement direction has been described on the basis of the insulating portions. However, when the insulation is implemented only by the open regions without the insulating portions, "insulating portions" may be substituted with "open regions" in the above description of the arrangement direction.

This process has been described as an example for forming an electric double layer cell with a multi-layer structure corresponding to the electric double layer cell of FIG. 2. If necessary, however, when the basic unit illustrated in FIG. 1 is to be formed, the process may be substituted with a process of forming a multilayer body in which the separator 45 is disposed between the active material layers 43 of the electrode sheet 42 of FIG. 4B.

When three or more electrode sheets are used, electrode sheets positioned inside exist. The electrode sheet positioned inside faces active material layers positioned at both surfaces of each of the adjacent electrode sheets. Therefore, an electrode sheet having the active material layers 53 formed on both surfaces thereof may be used like the electrode sheet 52 of FIG. 6C.

Figure 8C:
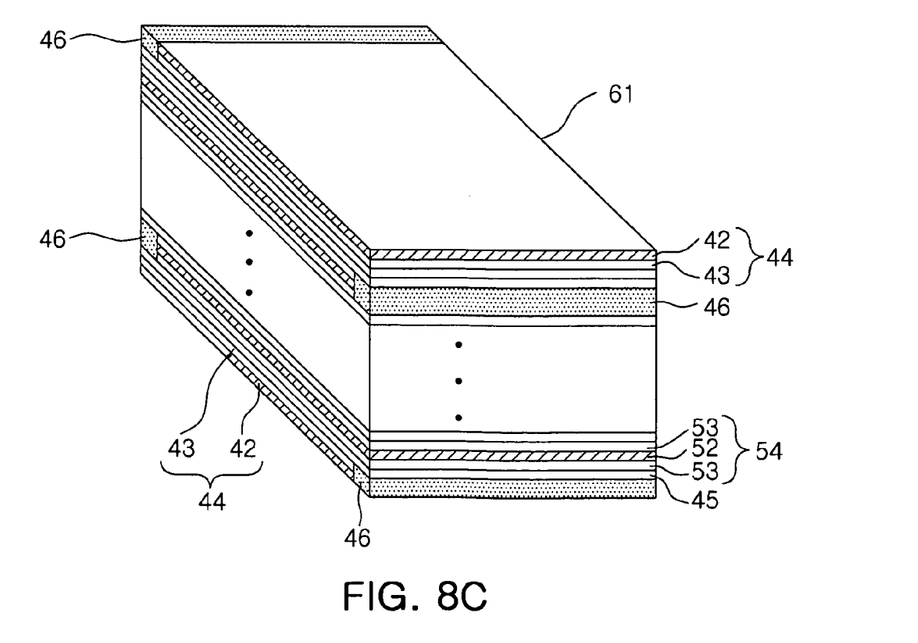
FIG. 8C is a perspective view of the electric double layer cell obtained by the cutting process of FIG. 8B.

Subsequently, referring FIG. 8B, the multilayer body 61 may be cut along a cutting line C to obtain electric double layer cells (six cells in this example) illustrated in FIG. 8C. The electric double layer cells illustrated in FIG. 8B may have a similar structure to that of the electric double layer cell 20 illustrated in FIG. 2.

External electrodes may be formed on both surfaces of the electric double layer cell 61 illustrated in FIG. 8B to manufacture an EDLC having a similar structure to that of the EDLC illustrated in FIG. 3. Since the side surfaces where the external electrodes are formed are selectively exposed by the insulating portions 46, depending on the electrode polarities, each of the polarizable electrodes may be connected to an external electrode having the same polarity.

According to the embodiments of the present invention, since the polarizable electrode and the separator are manufactured using sheets, the electric double layer capacitor may be provided as a chip-shaped product of which the thickness is easily controlled, and it is possible to significantly increase productivity and operational efficiency.

Furthermore, since the thickness of the polarizable electrode and the separator may be controlled, the area of the current collection body serving to control ESR may be increased. Then, the current collection body may be implemented in a similar shape to a side external electrode of a typical chip such as MLCC. In addition, since the external electrode may be positioned adjacent to the active material layer, it is possible to significantly reduce ESR.

While the present invention has been shown and described in connection with the exemplary embodiments, it will be apparent to those skilled in the art that modifications and variations can be made without departing from the spirit and scope of the invention as defined by the appended claims.

What is claimed is:

1. An electric double layer capacitor (EDLC) comprising:
an electric double layer cell comprising a separator and at least one first polarizable electrode and at least one second polarizable electrode which are alternatively stacked with the separator interposed therebetween; and
first and second external electrodes formed at first and second side surfaces of the electric double layer cell facing each other, respectively,
wherein the first polarizable electrode comprises a first current collection layer and a first active material layer formed on either surface of the first current collection layer facing the separator, extends to the first side surface of the electric double layer cell so as to be connected to the first external electrode, and is electrically separated from the second side surface so as to be insulated from the second external electrode, and
the second polarizable electrode comprises a second current collection layer and a second active material layer formed on either surface of the second current collection layer facing the separator, extends to the second side surface of the electric double layer so as to be connected to the second external electrode, and is electrically separated from the second side surface so as to be insulated from the first external electrode.

2. The EDLC of claim 1, further comprising:
a first insulating portion formed between the first polarizable electrode and the first side surface of the electric double layer cell such that the first polarizable electrode and the second external electrode are electrically insulated from each other, and
a second insulating portion formed between the second polarizable electrode and the second side surface of the electric double layer cell such that the second polarizable electrode and the first external electrode are electrically insulated from each other.

3. The EDLC of claim 2, wherein the plurality of first polarizable electrodes and the plurality of second polarizable electrodes are provided,
each of the first polarizable electrodes positioned inside the electric double layer cell comprises two first active material layers positioned on both surfaces of the first current collection layer, and
each of the second polarizable electrodes positioned inside the electric double layer cell comprises two second active material layers positioned on both surfaces of the second current collection layer.

4. The EDLC of claim 3, wherein the first polarizable electrode positioned at one outer surface of the electric double layer cell comprises one first active material layer, and the second polarizable electrode positioned at the other outer surface of the electrode double layer cell comprises one second active material layer.

5. The EDLC of claim 2, wherein the first and second electrodes and the separators are exposed to the other side surfaces excluding the first and second side surfaces among the side surfaces of the electric double layer cell.

6. The EDLC of claim 2, wherein the electric double layer cell has a rectangular parallelepiped structure.

* * * * *